June 1, 1965 R. B. STANLEY 3,186,451
FILLING APPARATUS
Filed April 6, 1962 4 Sheets-Sheet 1
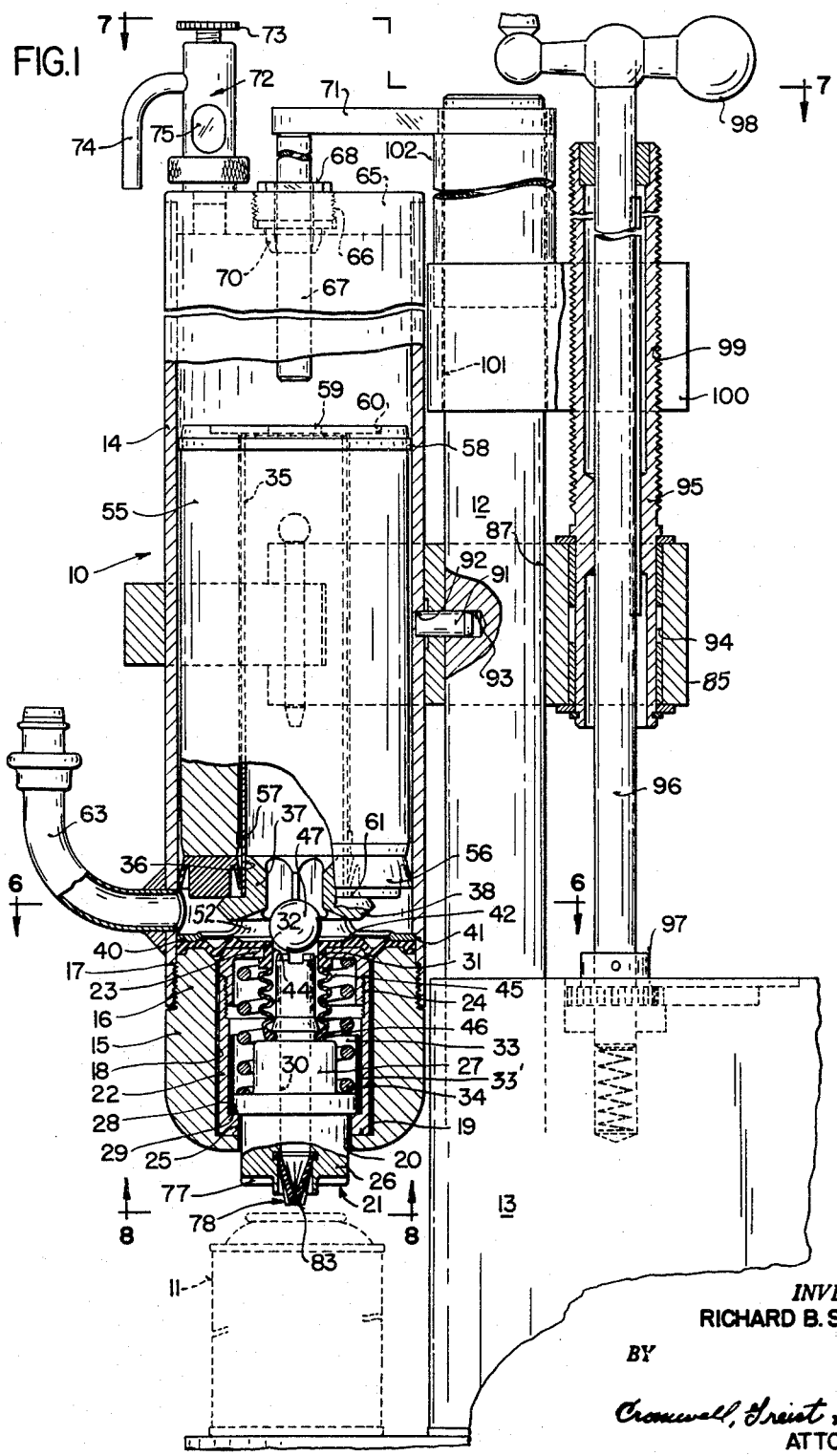
INVENTOR.
RICHARD B. STANLEY
BY
Cromwell, Greist & Warden
ATTORNEYS June 1, 1965  R. B. STANLEY  3,186,451
FILLING APPARATUS
Filed April 6, 1962  4 Sheets-Sheet 2
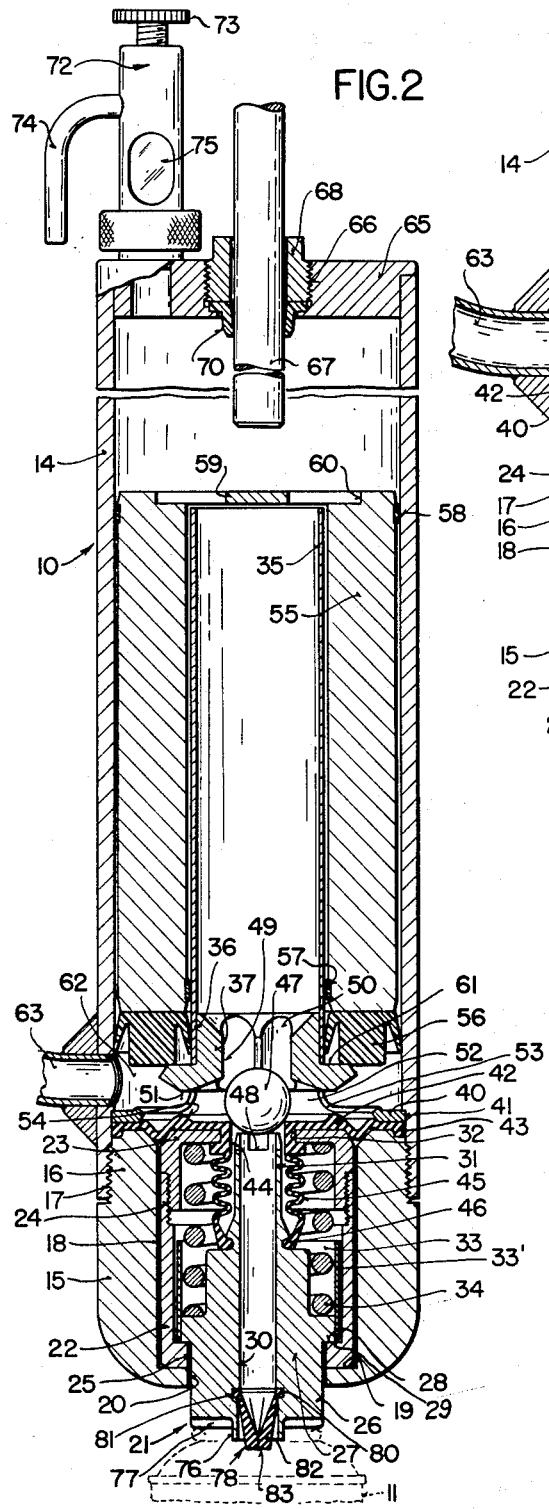
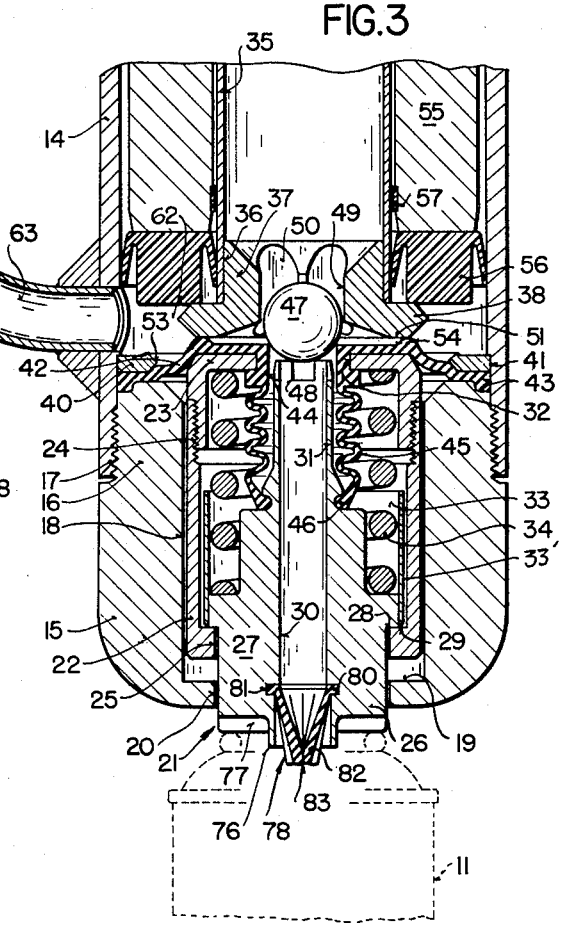
INVENTOR.
RICHARD B. STANLEY
BY
Cromwell, Greist & Warden
ATTORNEYS

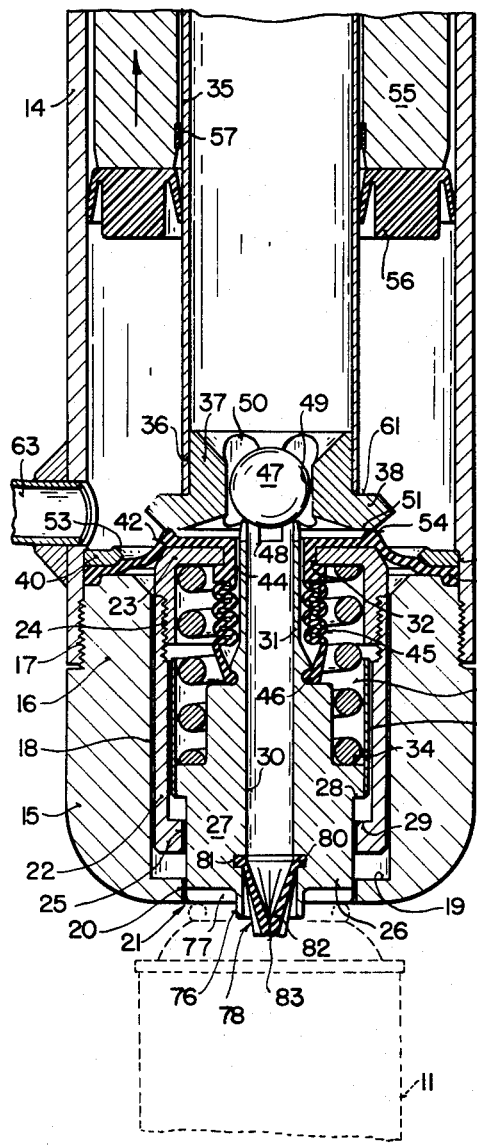
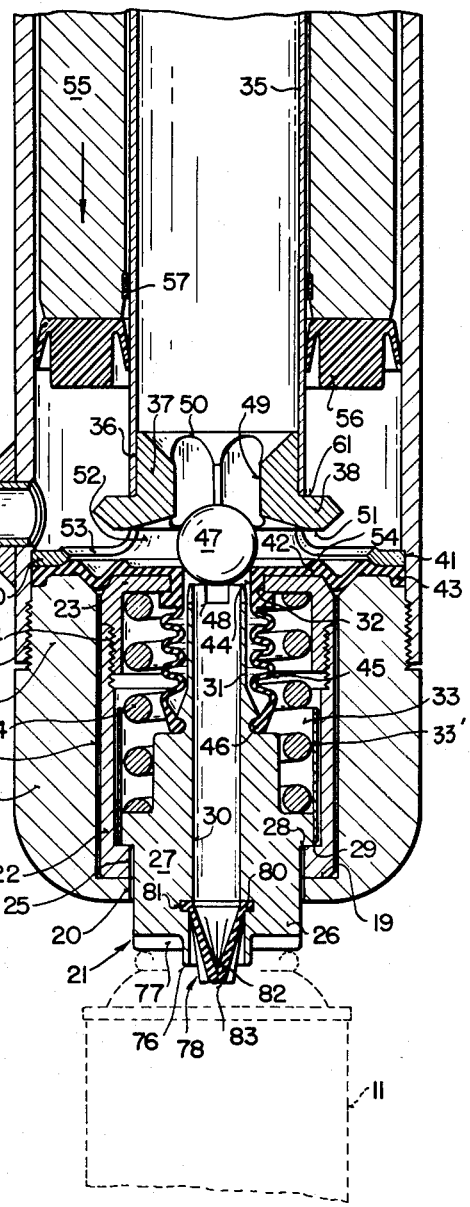

June 1, 1965

R. B. STANLEY 3,186,451

FILING APPARATUS

Filed April 6, 1962

INVENTOR.
RICHARD B. STANLEY
BY
Cromwell, Griest + Warden
ATTORNEYS 3,186,451
FILLING APPARATUS
Richard B. Stanley, Park Ridge, Ill., assignor to The Kartridg Pak Co., Davenport, Iowa, a corporation of Iowa
Filed Apr. 6, 1962, Ser. No. 185,547
11 Claims. (Cl. 141—360)

This invention relates to apparatus for handling a product which is in a fluid or semi-fluid condition and is more particularly concerned with improvements in a device for dispensing a measured quantity of the product in connection with the filling of the product into receptacles.

It is a general object of the invention to provide a device for receiving a fluid or semi-fluid material from a supply line and for discharging a measured quantity of the material into the mouth of a container or receptacle so as to enable successive containers to be charged with the same quantity of the material by successive operations of the device.

It is a more specific object of the invention to provide for delivering a measured quantity of a fluid or semi-fluid material into a container or receptacle which device is so constructed that the dispensing of the material therefrom occurs simultaneously with the charging of the device for a succeeding dispensing cycle.

It is a further object of the invention to provide a device for dispensing measured quantities of a product which is adapted to be connected into a pressurized product supply line so that the pressure in the supply line may be controlled, thereby to regulate the speed with which the material is dispensed from the device and to compensate for variations in the viscosity of the material.

It is another object of the invention to provide a product measuring and dispensing device for filling a container or the like wherein the device is so constructed that when it is connected to a source of product supply, a measured quantity of the product will flow from a dispensing nozzle at the discharge end of the device with the speed of discharge of the product being a function of the pressure under which the product is supplied to the device.

It is a still further object of the invention to provide a product dispensing device which comprises an outer cylindrical housing, an inner cylindrical member of smaller cross sectional diameter mounted in axial relation therein, a floating piston between the inner cylindrical member and the outer housing, with the inner member having valve controlled communication with a reciprocable nozzle which is mounted in the lower end of the housing and with a valve forming arrangement between the nozzle, the outer housing, and the inner member so as to control the flow of material within the device whereby the device may be connected to a supply line which will deliver the material under pressure to a chamber below the piston and permit a charge of the material to be dispensed from the device upon reciprocation of the nozzle while a subsequent charge is delivered into the same through the supply line.

It is a still more specific object of the invention to provide a device which is especially adapted for filling a succession of containers such as aerosol cans or the like with measured quantities of a flowable material which comprises an outer cylindrical housing and a concentric inner tube member of smaller cross sectional diameter with a floating piston mounted between the tube member and the housing, a reciprocable discharge nozzle disposed below the bottom end of the tube member and the lower end of the piston and valve mechanisms which provide for discharge of the material from the inner tube member through the nozzle when the nozzle is retracted by engagement with the can while simultaneously permitting the material to flow into the device through a pressurized supply line so as to displace the piston and provide a charge for delivery into the tube when the latter is emptied by delivery into the can and the nozzle is returned to non-discharging position.

It is another object of the invention to provide a product dispensing device which may be economically constructed with a minimum of parts, which is adapted to be readily cleaned after use, which is free of leakage, which may be used in any location, and which provides for accurate and uniform dispensing of successive charges of the material.

These and other objects and advantages of the invention will be apparent from a consideration of the product filling head which is shown by way of illustration in the accompanying drawings wherein:

FIGURE 1 is a side elevation, with portions broken away, of a product filler head which embodies therein the principal features of the invention, the head being illustrated as mounted on an aerosol container filling machine;

FIGURE 2 is a vertical section through the filler head, to a larger scale and with portions broken away, the various elements being disposed in non-discharging position just prior to engagement with the mouth of an aerosol container;

FIGURE 3 is a partial vertical section through the filler head, to a still larger scale, the elements being in the position occupied just prior to the discharge of the product through the nozzle and into the container;

FIGURE 4 is a partial vertical section similar to FIGURE 3 but with the elements in position for discharge of the product into the container;

FIGURE 5 is a partial vertical section similar to FIGURE 3 but with the elements in position for recharging the head;

Figure 6:
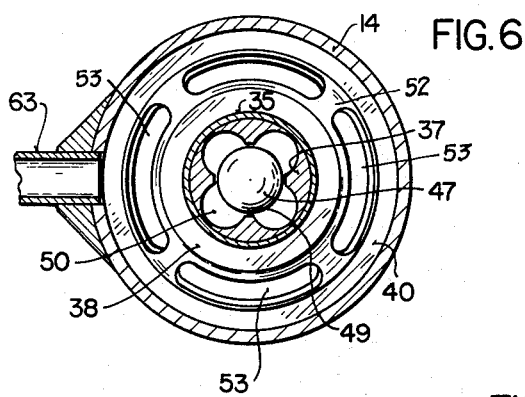
FIGURE 6 is a cross section taken on the line 6—6 of FIGURE 1, to an enlarged scale.

Referring to the drawings, the invention is illustrated as embodied in a device 10 which is designed particularly for delivering measured charges of a flowable product into successive containers or receptacles 11, for example, cans of the type used for aerosol bombs. The device 10, which may be referred to as a filler head, is illustrated as employed in a rotary type filling machine for aerosol containers. One such machine is described in copending application Serial No. 75,414, filed December 12, 1960. The filled head 10 is carried in vertically disposed relation on a supporting post 12 with the latter being mounted for vertical movement on the margin of a turntable 13. The containers 11 are supported in aligned relation beneath the filled head on a platform or ledge which extends about the turntable and provision is made for lowering and raising the head relative to the container 11 so that the filler head 10 contacts the top of the container during the filling operation. The relative movement of the filler head and the container may, of course, be reversed.

The filler head 10 comprises a cylindrical casing member 14, which forms an outer housing and which is closed at its bottom end by a cup-like cap member 15. The cap member 15 has a rim section 16 of reduced diameter which is secured within the lower end of the housing 14 by the cooperating screw threads 17 provided on the housing and the cap member. The cap member 15 has an axial bore 18 which extends to a shoulder formation 19 provided by forming a bottom opening 20 of smaller diameter than the bore 18.

The cap 15 constitutes a retainer for a nozzle assembly 21 which is mounted in the bore 18 and which comprises a two part casing or shell with the two parts 22 and 23 having telescoping flanges and a screw threaded connection at 24. The outer or lowermost part 22 of the casing has an end opening 25 of the same diameter as the opening 20 in the cap 15 and is adapted to receive in sliding relation therein the bottom portion 26 of the nozzle body 27. The lowermost end portion 26 of the nozzle body 27 is of smaller diameter than the portion immediately above the same so as to form a downwardly facing abutment shoulder 28 for cooperation with the shoulder formation 29 on the casing member 22 in limiting the outward or downward movement of the body 27. The nozzle body 27 is provided with an axial bore 30 and its uppermost end portion 31 is reduced in diameter so as to pass through an opening 32 in the end of casing member 23. An axially extending, upwardly opening annular recess 33 is provided in the nozzle body 27 by securing a cylindrical sleeve member 33′ about the middle portion thereof and one end of a compression spring 34 is seated therein. The other end of the spring 34 engages with the flange-like end portion of the casing member 23 so that the spring 34 normally tends to hold the nozzle body 27 in its lowermost position.

An inner open ended hollow tube member 35 of cylindrical section, which is substantially shorter than and which has a diameter substantially less than the diameter of the outer cylindrical housing 14, is disposed in concentric relation within the latter, with its lowermost end 36 mounted on the hub forming portion 37 of a supporting spider 38. The spider 38 is of inverted generally cup-shaped formation with the inner hub forming portion 37 seated in the end 36 of the tube member 35 and with a peripheral flange 40 extending in a transverse plane and seated in a recess 41 in the inner surface of the housing member 14 immediately above the threaded connection 17 and clamped therein by the cap member 15.

A flexible sealing member 42 is interposed between the flange 40 of the spider 38 and the cap 15 and nozzle assembly 21 below the same so that a bead formation 43 on the outer peripheral margin of the sealing member 42 is clamped between the flange 40 of the spider 38 and the top edge of the cap member 15. The sealing member 42 extends inwardly over the end of the casing member 23 and around the edge of the opening 32 so as to form a tubular passageway 44 for receiving the upper end portion 31 of the nozzle body 27. The tubular portion of the sealing member 42 which provides the passageway 44 is connected at its lower edge by a tubular bellows formation 45 with the nozzle body 27. The tubular bellows 45 has a bead-like edge 46 which is seated in a peripheral recess provided at the bottom end of the upper portion 31 of the nozzle body 27 so as to form a seal therewith.

A valve forming ball 47 is positioned above the upper end of the tubular passageway 44 on the flexible valve member 42 with the ball 47 having a diameter substantially greater than the diameter of the passageway 44 so as to form a closure therefor when seated in engagement with the uppermost edges thereof. The upper end of the nozzle portion 31 is slotted at 48 to permit the passage of material beneath the ball 47 and into the axial passageway 30 in the nozzle body 27 when the ball 47 is lifted so as to open the passageway 44 which the ball 47 otherwise closes. In the non-discharging position of the nozzle assembly 21 as shown in FIGURE 2 with the end 26 of the valve body 27 extended the valve ball 47 is aligned with a center opening or passageway 49 in the hub forming portion 37 of the spider 38. The hub 37 has radially extending recesses 50 cut in the wall thereof so as to permit passage of fluid around the ball when the ball is moved up into the passageway 49 so that it would otherwise close the same. In the non-discharging position of the nozzle assembly 21 the bottom face 51 of the hub portion of the spider 38 is spaced above the top surface of the sealing member 42. The lower edge of this portion 37 is connected with the peripheral flange 40 thereof by an outwardly and downwardly inclined wall section 52 which is provided with apertures 53 normally permitting communication between the bottom of the chamber formed between the inner tube member 35 and the outer housing 14 and the space below the hub portion 37 of the spider 38 and above the flexible sealing member 42. The sealing member 42 is provided with an annular shoulder 54 on its top surface which is adapted to engage with the bottom face 51 of the spider 38 when the nozzle assembly 21 is raised a predetermined distance or approximately half its maximum vertical movement, as shown in FIGURE 3. This seals off the passageways formed by the apertures 53 and places the axial bore 30 of the nozzle in communication with the interior of the inner tube member 35.

A weighted piston 55 of tubular section surrounds the inner tube member 35 and substantially fills the space between the walls of the tube member 35 and the outer housing 14. At its lower end the piston 55 is provided with a cup seal 56 of "Teflon" or similar material. The piston 55 is provided with inner and outer guide rings 57 and 58 adjacent its bottom and top ends, respectively, and at its top end a plate-like strap 59 is set in a recess 60 which surrounds the end of the axial bore. At its lower end the movement of the piston 55 is limited by engagement of the cup seal 56 with the shoulder formation 61 on the hub forming portion 37 of the tube supporting spider 38. This leaves an annular pocket 62 (FIGURE 2) immediately beneath the cup seal 56 when the piston 55 is in its lowermost position with the openings 53 in the spider connecting the pocket 62 with the space between the lower face 51 of the spider 38 and the upper face of the flexible sealing member 42. A product supply tube or conduit 63 is suitably connected to empty into the pocket 62 so as to connect the same with a suitable supply line through which the product will be delivered under predetermined pressure such as required to normally force the product into the pocket 62 for charging the filler head.

The outer housing 14 is closed at its top end by a cap forming member 65 having an axial aperture 66 in which a fill metering rod 67 is mounted by means of a packing nut 68 and rod seal 70. The metering rod 67 is adapted to be adjusted vertically with its upper end abutting the free end of a bracket arm 71, carried in vertically adjustable relation on the post 17, so that the vertical position, or elevation, of the lower end of the metering rod 67 may be set to limit the upward movement of the piston 55 by engagement with the strap 59 in the top of the piston. A bleeder assembly 72 is mounted in the cap 65 which comprises a needle valve (not shown) having a manual control through the knob 73 so as to permit discharge of material from the top of the housing 14 and out through the discharge pipe 74. A sight window 75 is provided in the lower portion of the housing for the assembly 72 so that the presence of any air bubbles in the material in the housing 14 can be detected and the material drawn off through the valve assembly 72 thereby removing any trapped air within the product.

The nozzle body 27 has a spout forming reduced section 76 on the lower end 26 with a vent slot 77 and a no-drip spout member 78 (FIGURES 1 to 5, 8 and 9) is seated within the end of the axial bore 30. The spout member 78, which is of rubber or similar material, is of generally tubular shape with an upper flange 80 adapted to be received in an annular recess 81. The vertical walls 82 are fluted or pleated and the lower end 83 is normally closed. When the product is forced through the nozzle opening 30 and into the spout member 78, the pressure of the product expands or distends the fluted walls 82 and causes the lower end 83 of the device to open so as to permit flow of the product through the same.

Figure 7:
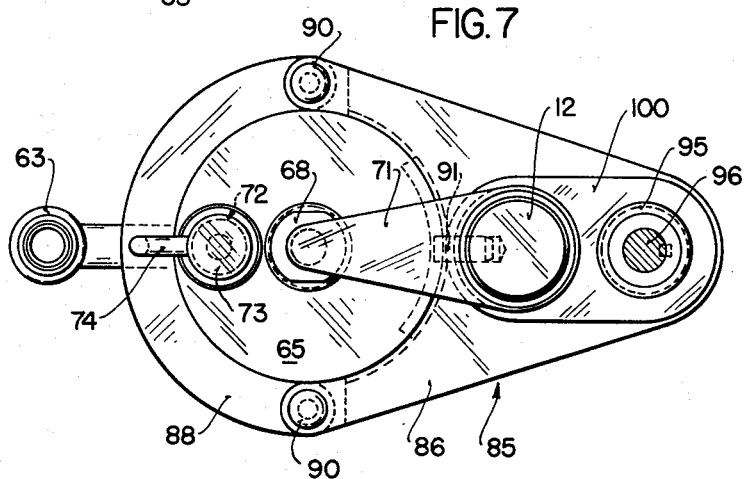
FIGURE 7 is a view taken on the line 7—7 of FIGURE 1.
Figure 9:
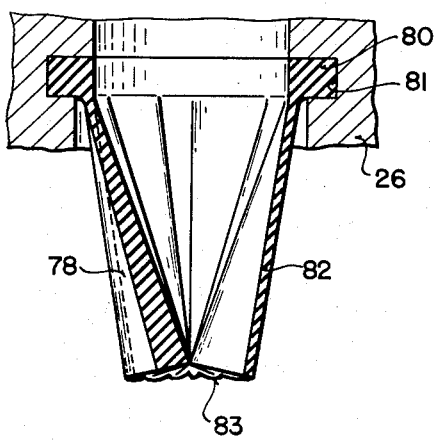
FIGURE 9 is a fragmentary section taken on the line 9—9 of FIGURE 8.
Figure 8:
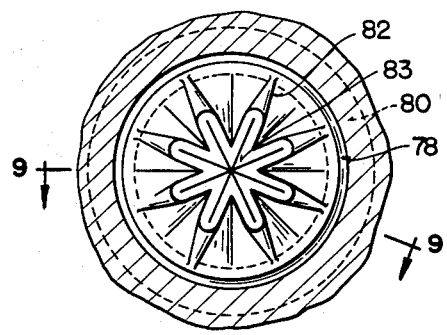
FIGURE 8 is a view taken on the line 8—8 of FIGURE 1, to an enlarged scale, and with portions broken away.

In FIGURE 1 the filler head 10 is shown mounted in fixed relation on the vertically reciprocable supporting post 12 by means of the horizontally extending bracket assembly 85 (FIGURES 1 and 7). The bracket assembly 85 comprises a main member 86 having a vertical bore 87 which receives the post 12, and a semi-circular clamp member 88 which is attached to the main member by a pair of connecting pins 90 and which clamps the housing 14 to the bracket assembly 85. A locating pin 91 extends into socket forming bores 92 and 93 in the housing 14 and the post 12 and prevents rotation of the filler head about its vertical axis. The main bracket member 86 is extended inwardly of the post 12 and provided with a vertical bore 94 which is parallel with the bore 87. A vertically disposed sleeve member 95 is mounted on a vertical adjusting shaft or post 96 by means of a key which permits axial sliding movement. The lower end of the sleeve 95 is journaled in the vertical bore 94 in bracket 85. The post 96 has its lower end journaled at 97 in a suitable bearing support in the turntable 13 so that it may be rotated about its vertical axis and a handle 98 is provided on the upper end for that purpose. The sleeve member 95 has its upper end threaded externally and extends through a threaded bore 99 in a horizontally disposed slide member 100. The slide member 100 has a bore 101 parallel with the bore 99 through which the support post 12 extends. A sleeve extension 102 extends above the slide member 100 and supports the bracket arm 71 which limits the upward movement of the metering rod 67. With this arrangement the vertical position of the slide member 100 and arm 71 may be adjusted relative to the bracket assembly 85 by rotation of the adjusting post 96 thereby controlling the elevation of the lower end of the metering rod 67 which in turn controls the amount of the charge delivered by the head.

The operation of the filler head 10 is shown by the sequence of positions in FIGURES 2 to 5. To initially charge the device the supply line is opened and the product fed through the conduit 63 under pressure. The product will pass into the chamber 62, through the openings 53 in the spider 38, and through the passageway 49 up into the tube 35, rising above the same to fill the housing 14. The entrapped air in the housing 14 is allowed to escape through the bleeder assembly 72. In FIGURE 1, the valve assembly 21 is in initial nondischarging position with the device completely filled or loaded with the product. When the head is then lowered to engage the lower end of the nozzle in the opening in the container 11 or the container is raised to engage the nozzle and the relative movement is continued, the entire nozzle assembly 21 will be raised within the cap 15 (FIGURE 3) to engage the rib 54 of the sealing member 42 with the lower face 51 of the spider 38. This seals off the openings or passageways 53 in the spider side wall 52 so that the pressure of the incoming product is applied to the cup seal member 56 on the bottom end of the piston 55. Up to this point the passageway 44 in the seal member 42 is closed by the valve ball 47. As the relative movement of the container 11 and the device continues the nozzle body 27 moves upwardly against the pressure of the spring 34 and thrusts the ball 47 into the passageway 49 in the spider 38 (FIGURE 4). This opens the upper end of the passageway 44 in the seal member 42 so as to allow the flow of the product in the downward direction around the ball 47 through the slots 48 and into the axial passageway 30 in the nozzle body 27 for discharge into the container 11. The movement of the product down through the inner tube 35 relieves the pressure created by the product above the piston 55 and the incoming material moves the piston 55 upwardly (FIGURE 4) permitting the space between the tube 35 and the housing 14 to be filled with the product while the charge of product previously delivered into the tube 35 is discharged through the nozzle and into the can 11. The piston 55 rises until the strap 59 hits the bottom end of the metering rod 67 which is initially adjusted to provide the proper amount of product for each charge. Thus a measured amount or charge of the product is delivered into the container 11 simultaneously with the delivery of the next charge of the product into the filler head 10. When the piston 55 reaches its uppermost position the pressure on the product in the upper portion of the housing 14 is relieved and the downward flow through the nozzle discontinued. The container 11 and the nozzle are then separated and the spring 34 moves the nozzle body 27 to its initial position (FIGURE 5) with the ball 47 closing the passageway 44 and the passageways 53 opening to permit the flow of the product into the tube 35 as the piston 55 descends due to its weight and forces the product beneath the same through the openings 53 and the passageway 49 into the inner tube 35 until the piston 54 completes its descent when the device is ready for another filling cycle (FIGURE 1).

The piston 55 is illustrated as formed of solid material so as to give it substantial weight which will cause it to move downwardly when pressure on the product below the same is relieved. However, this member may be urged downwardly by a compression spring which would, of course, be engaged at one end with the piston and at the other end with a portion of the housing 14 or a member fixed relative thereto.

The extensible bellows portion 45 on the sealing member 42 forms a seal between the nozzle body 27 and the interior of the housing 14 so that the product flows through the nozzle passage 30 from a closed chamber and the pressure is reduced at the end of the filling cycle which reduces the tendency to drip. The no-drip spout member 78 closes off the passage 30 completely so as to insure that there is no drip after the charge is discharged into the container 11.

While particular materials and specific details of construction are referred to in describing the form of the filler head illustrated in the drawings, it will be understood that other materials and equivalent structural details may be resorted to within the spirit of the invention.

I claim:

1. A device for dispensing a measured quantity of a product into a receptacle comprising a vertically disposed tubular outer housing forming member, a nozzle assembly having an axial passageway mounted in vertically disposed slidable relation in the lower end of the said outer housing member, an inner tubular member of a lesser external diameter and a shorter length than the internal diameter and length of said outer housing member, said inner tubular member being disposed concentrically within said outer housing member and having its lower end spaced above the uppermost end of said nozzle, a weighted cylindrical piston supported in free floating relation in the space between the vertical walls of the inner tubular member and the outer housing member, a flexible plate-like sealing member disposed between the outer housing member and the inner end of the nozzle and normally spaced below the bottom end of the inner tubular member, said sealing member having a center aperture and being constructed to form a seal with the lower end of the inner tubular member when the nozzle is raised to a retracted position and to place the nozzle in communication with the inner tubular member, a valve forming member between the lower end of the inner tubular member and the upper end of the nozzle which is normally operative to close the center aperture in the sealing member and the upper end of the nozzle and which cooperates with the flexible sealing member to close off the space between the bottom end of the inner tubular member and the sealing member, and a conduit connecting the space between the sealing member and the lower end of the inner tubular member with a source of supply of the product under pressure.

2. A device as recited in claim 1, having a product receiving space between the flexible sealing member and the bottom end of the inner tubular member which is connected by passageways with the space between the sealing member and the bottom end of the piston which passageways are adapted to be closed by operation of the flexible sealing member when the nozzle is partially raised.

3. A device for dispensing a measured quantity of a flowable product into a container comprising a vertically disposed tubular outer housing forming member, a nozzle having an axial passageway mounted in vertically disposed slidable relation in the lower end of the outer housing member, an inner tubular member disposed within the outer housing member, said inner tubular member having its vertical walls spaced inwardly of the vertical walls of said outer housing member and having its lower end spaced above the uppermost end of said nozzle, a cylindrical piston supported in floating relation in the space between the walls of the inner tubular member and the outer housing member and urged in a downward direction, a flexible sealing member disposed between the outer housing member and the innermost end of the nozzle and normally spaced below the bottom end of the inner tubular member, said flexible sealing member being constructed to form a seal with the lower end of the inner tubular member when the nozzle is raised to a retracted position so as to place the nozzle in communication with the inner tubular member, a valve forming member between the lower end of the inner tubular member and the nozzle which is normally operative to close the nozzle and which cooperates with the flexible sealing member to close off the space between the bottom end of the inner tubular member and the sealing member, and a conduit connecting the space between the sealing member and the lower end of the inner tubular member with a source of supply of the product under pressure.

4. A device for dispensing a measured quantity of a flowable product into an open top container comprising a vertically disposed tubular outer housing forming member, a nozzle having an axial discharge passageway mounted in vertically disposed spring pressed, slidable relation in the lower end of said outer housing member, an inner tubular member disposed concentrically within the outer housing member, said inner tubular member having vertical walls spaced from the walls of the outer housing member and its lower end spaced above the uppermost end of said nozzle, a cylindrical piston supported in free floating relation in the space between the walls of the inner tubular member and the outer housing member, means for limiting the vertical movement of said piston, a sealing member of flexible material disposed between the lower end of the inner tubular member and the uppermost end of the nozzle, said sealing member being constructed to form a seal between the lower end of the inner tubular member and the outer housing member when the nozzle is raised to position the discharge passageway in the nozzle in communication with the inner tubular member, a valve member at the lower end of the inner tubular member which is normally operative to close the uppermost end of the nozzle and which cooperates with the flexible sealing member to close off the space between the bottom end of the inner tubular member and the sealing member, and means for feeding a product under pressure to the space between the sealing member and the lower end of the inner tubular member.

5. A device as recited in claim 4, having means at the upper end of the housing for bleeding off entrapped air when a product is fed into said outer housing member.

6. A device as recited in claim 4, having a product receiving space between the flexible sealing member and the lower end of the inner tubular member which is connected by passageways with the area between the sealing member and the bottom end of the piston, said passageways being adapted to be closed by the flexible sealing member when the nozzle is partially raised.

7. A device for dispensing a measured quantity of a flowable product into a receptacle comprising a vertically disposed tubular outer housing, a cap closing the lower end of the housing and having an axial bore, a nozzle assembly slidably mounted in said bore, said nozzle assembly comprising a shell having top and bottom end openings, a nozzle body member having an axial passageway mounted in the shell with reduced end portions slidable in the end openings, thereof, a compression spring surrounding the top end of the nozzle body and urging it in the downward direction, an inner tubular member disposed concentrically within said outer housing, said inner tubular member having its walls spaced inwardly from the walls of said outer housing and having its bottom end spaced above the top end of said nozzle assembly when the nozzle assembly is in its lowermost position, a weighted cylindrical piston supported in free floating relation in the space between the walls of the inner tubular member and the outer housing, a flexible plate-like sealing member extending across the top of the nozzle assembly and normally spaced below the bottom end of the inner tubular member, said sealing member having a center aperture and a tubular bellows extending downwardly of the center aperture through the top opening in the nozzle shell and surrounding the top end of the nozzle body member with its end edges sealed to said body member, said flexible sealing member being raised into sealing engagement with the bottom end of the inner tubular member when the nozzle assembly is raised by engagement with a receptacle so as to place the passageway in the nozzle body in communication with the inner tubular member, a ball-type valve member disposed between the bottom end of the inner tubular member and the top end of the nozzle body member which is normally operative to close the center aperture in the sealing member and the top end of the nozzle body member and which is raised when the nozzle body member is raised within the nozzle shell against the force of said spring a sufficient distance to bring the top end of the nozzle body member above the flexible sealing member thereby to permit flow of material from the bottom end of the inner tubular member through the axial passageway in the nozzle body member.

8. A device for dispensing a measured quantity of a flowable product into a container comprising a vertically disposed tubular outer housing forming member, a cap on the bottom end of said outer housing member having an axial bore, a nozzle assembly comprising a shell with top and bottom openings, a nozzle body member having an axial passageway mounted in the shell with end portions of reduced cross section mounted in slidable relation in the end openings, an inner tubular member disposed concentrically within the outer housing member, said inner tubular member having its walls spaced inwardly of the walls of the outer housing member and having its bottom end spaced above the top end of said nozzle assembly, a cylindrical piston supported in floating relation in the space between the walls of the inner tubular member and the outer housing member and normally urged in a downward direction, a cap in the upper end of the outer housing member having an axial opening and a stop rod for the piston adjustably mounted in the opening, a flexible sealing member disposed at the top end of the nozzle assembly and normally spaced below the bottom end of the inner tubular member, said flexible sealing member having a central opening coinciding with the top opening in the nozzle shell, said flexible sealing member being lifted into sealing relation with the bottom end of the inner tubular member when the nozzle assembly is raised in the bore of the bottom cap so as to place the axial passageway in the nozzle body in communication with the inner tubular member, a ball forming a valve member between the bottom end of the inner tubular member and the flexible sealing member which is normally operative to close the central opening in said flexible sealing member and which is adapted to be raised out of said opening when the flexible sealing member is raised by upward movement of the nozzle shell into seal forming relation with the bottom end of the inner tubular member to close off the space between the bottom end of the inner tubular member and the flexible sealing member, and a conduit connecting the space between the flexible sealing member and the bottom end of the inner tubular member with a source of supply of the product under pressure.

9. A device for dispensing a measured quantity of a flowable product into a receptacle comprising a vertically disposed tubular outer housing, a cap closing each end of said outer housing and each cap having an axial bore, a nozzle assembly slidably mounted in the bore in the bottom cap, said nozzle assembly comprising a shell having top and bottom end openings, a nozzle body member having an anxial passageway mounted in the shell, said nozzle body member having reduced end portions slidable in the end openings of the shell, a compression spring surrounding the uppermost end of the nozzle body and urging it downwardly within the shell, an inner tubular member disposed concentrically within the outer housing and having its lowermost end mounted on a spider which is spaced above the top end of said nozzle assembly when the nozzle assembly is in its lowermost position, a weighted cylindrical piston supported in free floating relation in the space between the walls of the inner tubular member and the outer housing, a flexible plate-like sealing member extending across the top of the nozzle assembly between the nozzle assembly and said spider, said sealing member having a center aperture aligned with an axial passageway in the spider, and a tubular bellows extending downwardly of the center aperture through the top opening in the nozzle shell and around the uppermost end of the nozzle body member with its free end edges sealed to said body member, said spider having openings in the wall thereof around the bottom end of said inner tubular member, said flexible sealing member being raised into engagement with the spider when the nozzle assembly is raised by engagement with a receptacle so as to close the openings in the spider wall and place the nozzle in communication with the inner tubular member, a valve forming ball member disposed between the lowermost end of the inner tubular member and the uppermost end of the nozzle body member which is normally operative to close the center aperture in the flexible sealing member and the uppermost end of the nozzle body member and which is raised when the nozzle body member is raised within the nozzle shell against the force of said spring a sufficient distance to bring the uppermost end of the nozzle body member above the flexible sealing member thereby to permit flow of material from the lowermost end of the inner tubular member through the axial passageway in the nozzle body member.

10. A device for dispensing a measured quantity of a flowable product into an open top container comprising a vertically disposed tubular outer housing forming member, a nozzle having an axial discharge passageway mounted in spring pressed vertically slidable relation in the lower end of the outer housing member, an inner tubular member disposed concentrically within the outer housing member, said inner tubular member having its bottom end spaced above the top end of said nozzle and having its vertical walls spaced from the vertical walls of said outer housing member, a cylindrical piston supported in free floating relation between the walls of the inner tubular member and the outer housing member, means for limiting the vertical movement of said piston, a sealing member of flexible material disposed between the bottom end of the inner tubular member and the top end of the nozzle and having a central opening, said sealing member being constructed to form a seal between the bottom end of the inner tubular member and the outer housing member when the nozzle is raised to position the discharge passageway in the nozzle in communication with the inner tubular member, and a valve member at the bottom end of the inner tubular member which is normally operative to close the top end of the nozzle and the central opening in the sealing member and which permits flow of the product through the flexible sealing member and the nozzle when the nozzle is forced upwardly in the housing by engagement with the container.

11. A device as recited in claim 10, having a flexible tube-type member at the bottom end of the passageway in the nozzle which is normally closed at its bottom end and which is forced open for passage of the product by pressure discharge of the product.

References Cited by the Examiner
UNITED STATES PATENTS

| | | | |
|---|---|---|---|
| 2,505,799 | 5/50 | Smith | 141—277 X |
| 3,013,591 | 12/61 | Stanley et al. | 141—3 |
| 3,023,791 | 3/62 | Strain | 141—270 |

LAVERNE D. GEIGER, *Primary Examiner.*